S. N. BROWN & H. W. MEYER.

FEED AND PRESSURE ROLLERS FOR PLANING MACHINES.

No. 7,242. Reissued July 25, 1876.

Witnesses;
Chas. M. Peck
Leo Greulich

Inventors;
Samuel N. Brown
and
Henry W. Meyer
by their Attys.
Peck & Co.

N. PETERS, PHOTO-LITHOGRAPHER, WASHINGTON, D. C.

UNITED STATES PATENT OFFICE.

SAMUEL N. BROWN AND HENRY W. MEYER, OF DAYTON, OHIO.

IMPROVEMENT IN FEED AND PRESSURE ROLLERS FOR PLANING-MACHINES.

Specification forming part of Letters Patent No. 158,671, dated January 12, 1875; reissue No. 7,242, dated July 25, 1876; application filed June 28, 1876.

*To all whom it may concern:*

Be it known that we, SAMUEL N. BROWN and HENRY W. MEYER, both of Dayton, Ohio, have invented a new and useful Improvement in Feed and Pressure Rollers for Planing-Machines, as fully set forth in the accompanying specification and drawings.

This invention relates to planing-machines in which it is desirable to work stuff of an uneven thickness and a number of pieces at one operation.

Our object is so to improve the feed or pressure rollers that the several pieces of stuff varying in thickness may be fed to the knives, and entirely avoid the trembling or jumping of the thinner ones, and the consequent danger of injury to them.

Our invention consists in the construction of an improved elastic feed or pressure roller having an interior cushioning-sleeve of elastic material, made sectional, placed firmly upon a shaft, and covered with a series of outer metallic rings, the whole held in place by a permanent and an adjustable head, as will be herewith described and specifically claimed.

To enable others skilled in the art to which our invention appertains to make and use the same, we would thus proceed to describe it, reference being had to the accompanying drawings.

Figure 1:
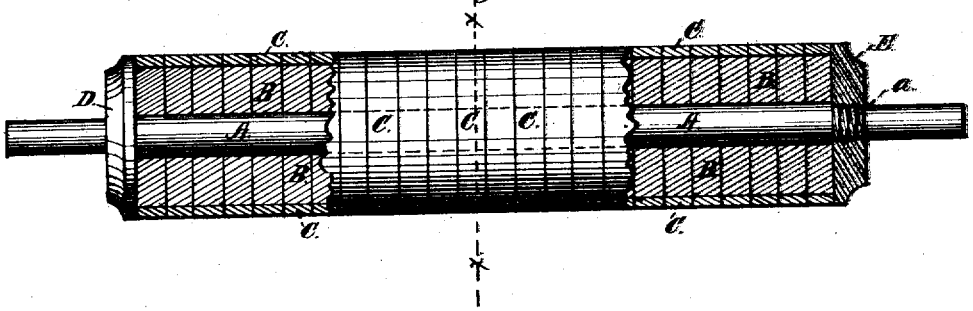
Figure 2:
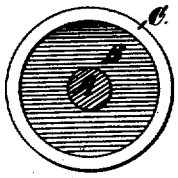

Figure 1 represents a sectional side elevation of the feed-roller. Fig. 2 is a transverse section of the same through the line *x x* of Fig. 1.

A represents the shaft of a feed or pressure roller; B, the sectional or sleeve-shaped packing-disks of rubber or other elastic material, fitted firmly to the shaft A. The metallic rings C are fitted snugly over the rubber, with their edges contiguous, and in such a way that the joints of the rubber disks and of the rings are unbroken.

The lateral displacement of the rings and disks is prevented by a solid metal head, D, which is keyed or otherwise permanently secured upon one end of the shaft A, and by a similar head, E, at the opposite end, which is screwed upon the threaded portion of the shaft A. By means of this adjustable head any wear of the edges of the rings and of the rubber disks can be compensated for by simply screwing it up more tightly.

The self-adjustment of the rubber-packed rings allows the holding and feeding of a number of pieces of stuff of uneven thickness without interfering with the regular working of the planing-machine.

The friction upon the shaft produced by the rubber confined within the rings is so powerful that the operation of feeding the stuff is greatly facilitated and accelerated, while the metallic covering-rings make these rollers more durable by protecting the inner packing, which is hardly exposed to wear thereby. The rollers combine, therefore, power, durability, and efficacy with that degree of elasticity required for feeding the stuff without injury to the material being planed.

We are aware that rollers composed of inelastic annular disks having an elastic bushing of india-rubber mounted on shafts, have been employed in clothes-wringers, which rollers were held upon the shafts only by pins passed through the terminal disks and the shaft, and were prevented from being laterally displaced by rods passed through the entire set of exterior inelastic rings.

Such an arrangement would entirely unfit them for the use designed by us. We however do not wish, broadly, to claim a roller composed of exterior inelastic rings, with bushings of elastic material, for such is not new; but What we do claim as new, and what we desire to secure by Letters Patent, is as follows:

In a planing-machine, the feed or pressure roller, composed of the shaft A, the elastic packing-disks B, and outer metallic covering-rings C, held to prevent lateral displacement by the permanent head D and the adjustable disk E, in the manner and for the purpose specified.

Witness our hands this 26th day of June, A. D. 1876.

SAMUEL N. BROWN.
HENRY W. MEYER.

Attest:
CHAS. M. PECK,
WM. RITCHIE.